United States Patent [19]

Ball

[11] Patent Number: 4,554,401
[45] Date of Patent: Nov. 19, 1985

[54] BURIED CABLE SPLICE CLOSURE

[75] Inventor: James H. Ball, Saint Paul, Minn.

[73] Assignee: Minnesota Mining and Manufacturing Company, St. Paul, Minn.

[21] Appl. No.: 618,485

[22] Filed: Jun. 8, 1984

[51] Int. Cl.[4] .................... H02G 9/00; H02G 15/113
[52] U.S. Cl. ...................................... 174/37; 174/76; 174/78; 174/92; 174/93
[58] Field of Search .................. 174/76, 78, 88 R, 92, 174/93, 37

[56] References Cited

U.S. PATENT DOCUMENTS

| 2,621,228 | 12/1952 | Tompers | 174/93 |
|---|---|---|---|
| 2,877,288 | 3/1959 | Bollmeier | 174/76 |
| 3,240,868 | 3/1966 | Ets-Hokin et al. | 174/93 |
| 3,466,380 | 9/1969 | Baumgartner et al. | 174/60 |
| 3,518,358 | 6/1970 | Brown | 174/138 F |
| 3,781,461 | 12/1973 | Thompson et al. | 174/76 X |
| 3,806,630 | 4/1974 | Thompson et al. | 174/37 X |
| 3,808,353 | 4/1974 | Burtelson | 174/78 X |
| 3,836,694 | 9/1974 | Kapell | 174/23 R X |
| 3,915,540 | 10/1975 | Thompson et al. | 174/78 X |
| 3,919,460 | 11/1975 | Neail et al. | 174/76 |
| 3,992,569 | 11/1976 | Hankins et al. | 174/76 X |
| 4,152,538 | 5/1979 | Gassinger et al. | 174/76 X |
| 4,283,592 | 8/1981 | Brownell, Jr. | 174/37 X |
| 4,341,922 | 7/1982 | Bossard et al. | 174/92 |

FOREIGN PATENT DOCUMENTS 1151586 5/1969 United Kingdom ................ 174/78

Primary Examiner—A. T. Grimley
Assistant Examiner—Morris H. Nimmo
Attorney, Agent, or Firm—Donald M. Sell; James A. Smith; Terryl K. Qualey

[57] ABSTRACT

A buried cable splice closure comprising a rigid plastic outer shell having an opening at least at one end through which cables may extend into the closure has a lower chamber adjacent each end opening for support of portions of cables extending into the closure with the cable jacket and any cable shield terminating in the lower chamber. An upper chamber is spaced longitudinally of the closure from each end opening so as to have a lower chamber between each end opening and the upper chamber and the upper chamber has a cable splice support area spaced a distance above each lower chamber when the splice closure is in an upright position. A cable passageway within the outer shell communicates between each lower chamber and the cable splice support area in the upper chamber and means are provided for permitting introduction of an encapsulant into at least each lower chamber.

13 Claims, 5 Drawing Figures

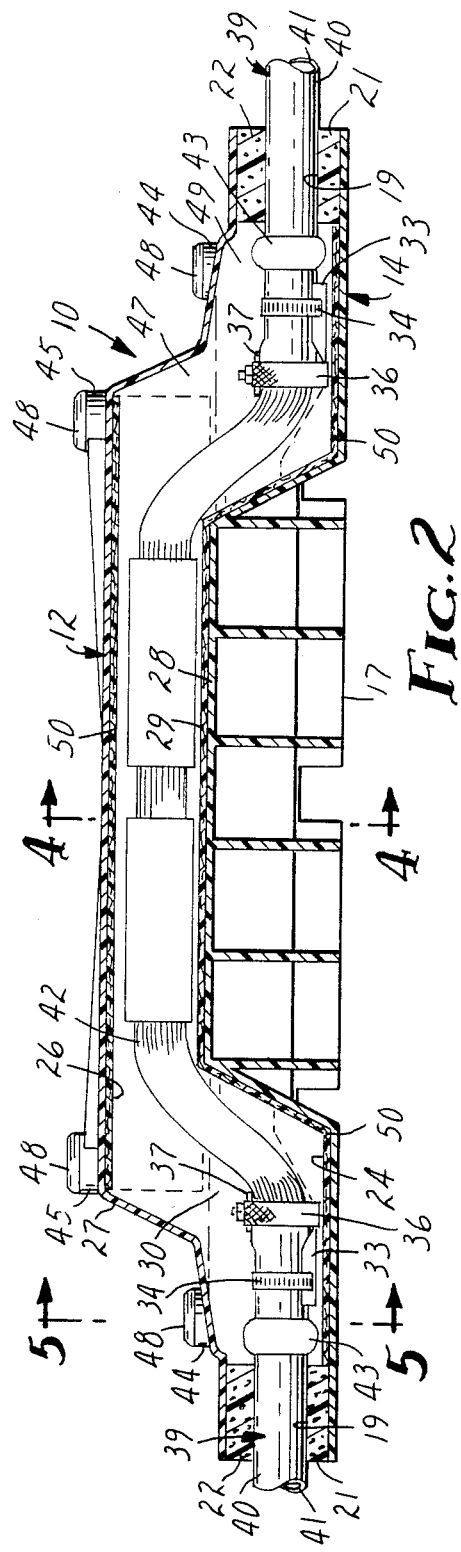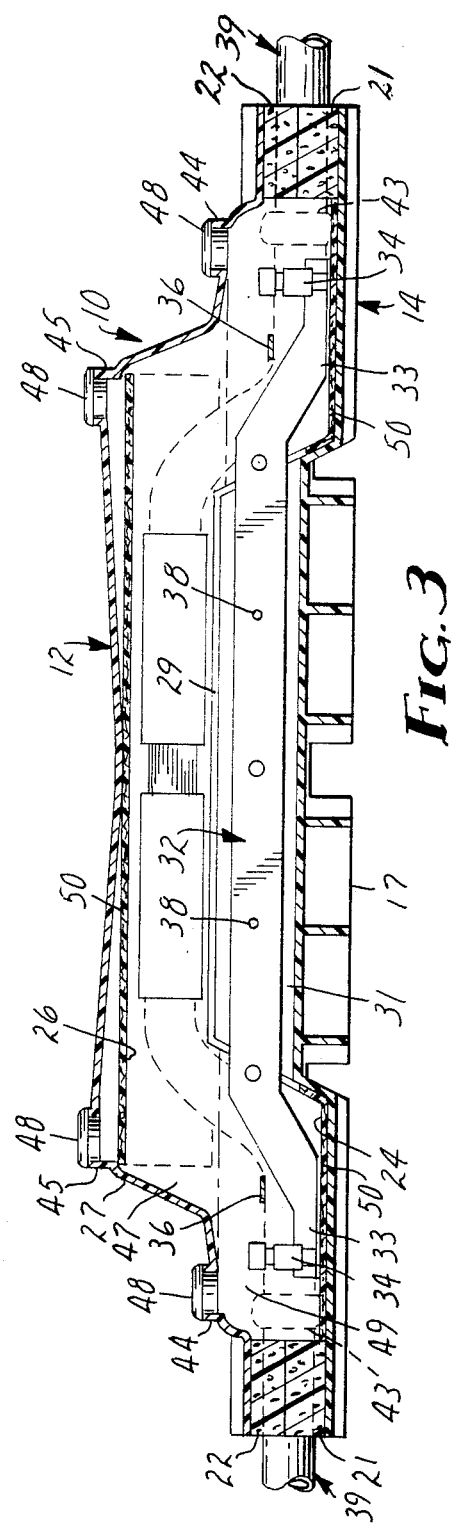

4,554,401

BURIED CABLE SPLICE CLOSURE

FIELD OF THE INVENTION

The present invention relates to a closure for a buried cable splice to keep ground water and cable core water away from the splice.

BACKGROUND OF THE INVENTION

Telephone and power cables are spliced at periodic intervals to make long continuous lengths of cables that connect to individual residences and businesses. Many cables are laid in open trenches and covered with rock and soil after they are installed. Water must be kept out of the cable splices to prevent shorting of the electrical connections, and various closures for encasing the splices have been proposed as exemplified by the closures disclosed in U.S. Pat. Nos. 3,240,868; 3,466,380; 3,518,358; 3,806,630; 3,836,694; 3,919,460; 3,992,569; 4,152,538 and 4,283,592. Frequently, the splice closure is laid in the bottom of the trench and buried when the trench is filled. In such cases it is usual to use a splice case in which the cable enters one end of the closure, the splice is supported in the central portion of the closure and the cable exits the opposite end as illustrated in U.S. Pat. Nos. 3,240,868; 3,836,694 and 3,992,569. While these closures have prevented ground water surrounding the splice case from entering the splice, none of the buried splice cases in use is wholly effective in preventing water that enters the core of the cable outside of the splice case from working its way down the core of the cable and into the splice even when the splice case is filled with an encapsulant as disclosed in U.S. Pat. Nos. 3,836,694 and 3,992,569.

SUMMARY OF THE INVENTION

The present invention provides a buried cable splice closure comprising a rigid plastic outer shell having an opening at least at one end through which cables may enter the closure. A lower chamber is provided adjacent each end opening in the shell for support of portions of cables extending into the closure with the cable jacket and any cable shield terminating in the lower chamber. An upper chamber is provided within the outer shell spaced longitudinally of the closure from each end opening so as to have a lower chamber between each end opening and the upper chamber. The upper chamber has a cable splice support area spaced a distance above each lower chamber when the splice closure is in an upright position, and a cable passageway communicates from each lower chamber to the cable splice support area in the upper chamber. Means are provided for permitting introduction of an encapsulant into at least each lower chamber. In use, any core water in the cable that enters the closure comes to the end of the cable jacket in the lower chamber and encounters encapsulant around and above the level of the cable and the encapsulant equalizes the water pressure and prevents the water from rising into the upper chamber.

THE DRAWING

In the drawing:

FIG. 2 is a longitudinal cross-sectional view of the splice closure with cables spliced therein, the section line being forward (as viewed in FIG. 2) of the midline of the closure;

FIG. 3 is a longitudinal cross-sectional view like that of FIG. 2, the section line being generally along the midline of the closure;

DESCRIPTION OF THE PREFERRED EMBODIMENT

Figure 1:
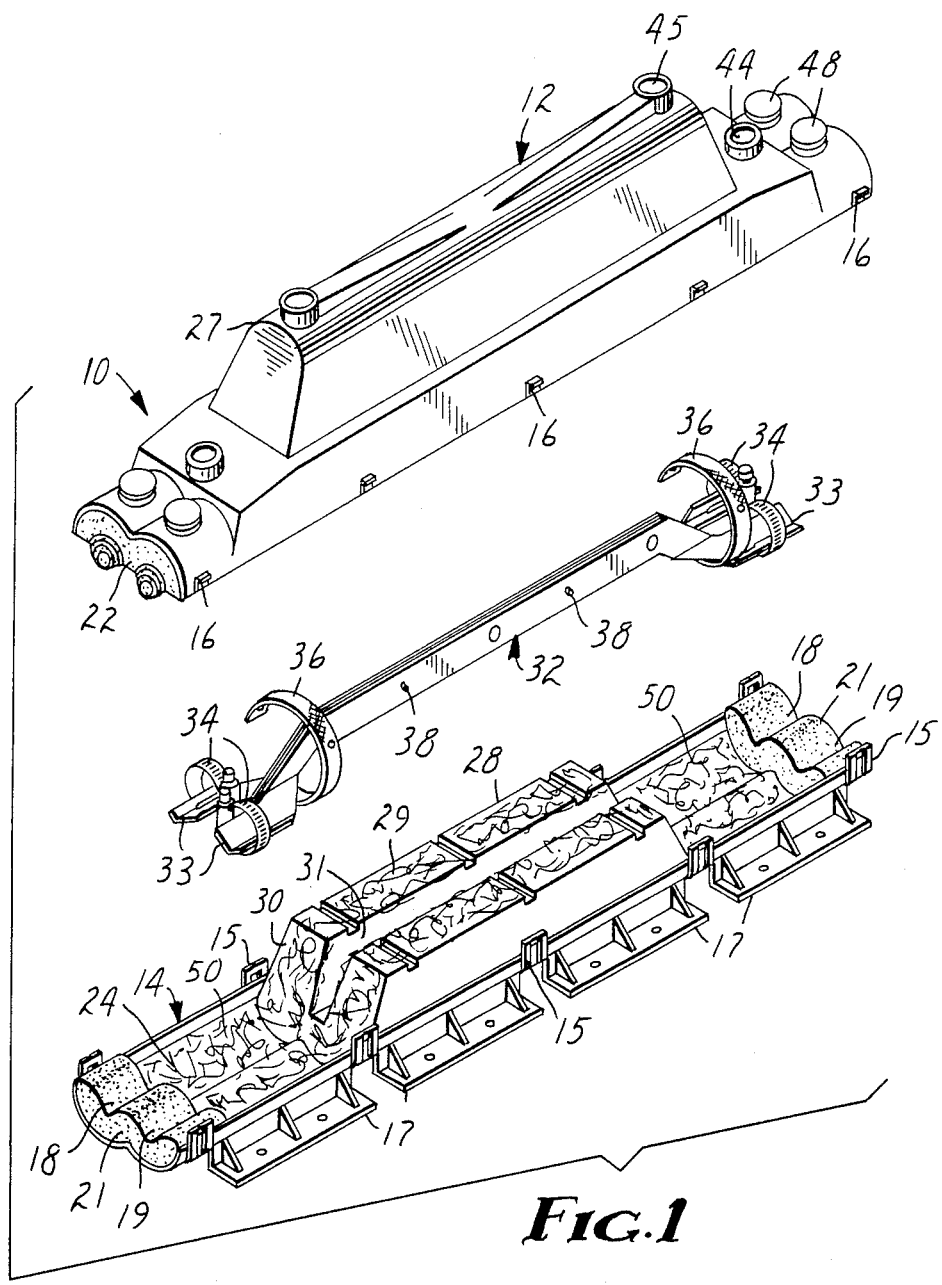
FIG. 1 is an exploded perspective view of a buried cable splice closure constructed in accordance with the present invention.

The illustrated buried cable splice closure is designed for splicing telephone cables. It comprises a rigid plastic outer shell 10 formed of an upper shell portion 12 and a lower shell portion 14 (see FIG. 1). The lower shell portion 14 has five U-shaped latches 15 along each of its longitudinal edges and the upper shell portion 12 has mating projections 16 for latching the upper shell portion 12 to the lower shell portion 14 to form the outer shell 10. The lower shell portion is formed with outwardly extending base flanges 17 on both longitudinal sides to define a base for the closure to aid in its positioning and support in a trench. The closure may be placed in a trench with its flanges 17 on the bottom of the trench or, for greater stability, it may be fastened to a board larger than the closure through apertures in the flanges.

At each end, the outer shell 10 has two cable openings 18 and 19 through which cables may extend into the closure. In the illustrated embodiment, the cable openings 18 and 19 are normally closed by compressible foam. A uniform thickness piece of foam 21 is adhered to the lower shell portion 14 at each end. A similar foam piece 22 is adhered to the upper shell portion 12 at each end, the upper foam pieces 22 each including a cylindrical portion along each cable entry path scored at various radii to permit an appropriate amount of foam to be torn away to accommodate a range of cable diameters to be spliced.

Adjacent each end opening 18 and 19 in the outer shell 10 a lower chamber 24 is defined between the walls of the upper shell portion 12 and the lower shell portion 14 (see FIGS. 2 and 3). Centrally, the closure is formed with an upper chamber 26 defined by a dome 27 in the upper shell portion and a raised splice support surface 28 in the lower shell portion 14. In the illustrated embodiment, the splice support area is the upper surface 29 of a spacer web bonded to the raised splice support surface 28. The splice support area 29 is spaced a distance above the lower chambers 24 when the closure is in an upright position (illustrated in the drawings) to assure that encapsulant filling the lower chambers will be at a level above the cable portions in the lower chambers. In one specific example, the illustrated closure is constructed such that when the largest cable for which the closure is designed is being spliced the splice support area 29 on the surface of the spacer web in the upper chamber 26 is about 3.8 cm. above the top of the portion of that cable in the lower chambers 24. The dome 27 in the upper shell portion 12 is longer than the raised support surface 28 in the lower shell portion 14 and the spaces between their inclined ends define cable passageways 30 from each lower chamber 24 to the upper chamber 26.

Figure 4:
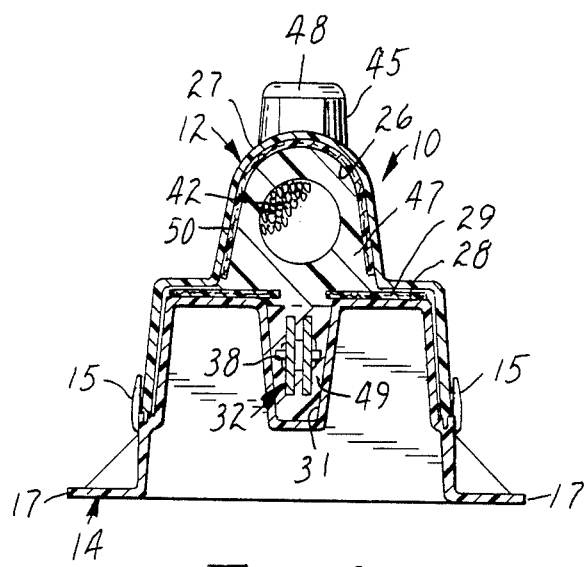
FIG. 4 is a transverse cross-sectional view taken generally along line 4—4 of FIG. 2.
Figure 5:
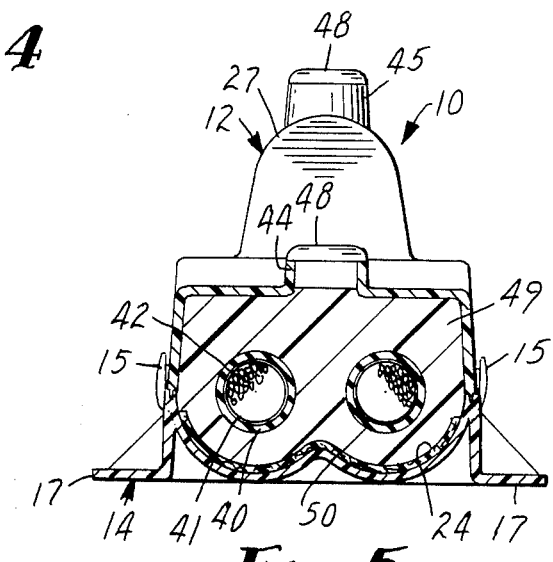
FIG. 5 is a transverse cross-sectional view taken generally along line 5—5 of FIG. 2.

The raised splice support surface 28 is divided into two segments by a central longitudinal groove 31 formed to receive the central portion of an aluminum shield bond bar 32 (see FIGS. 3 and 4). Each end of the shield bond bar 32 is formed to receive two cable ends in one of the lower chambers 24. For this purpose, each end of the bond bar 32 has two cable end trays 33 formed to align with the cable openings 18 and 19 and having a hose clamp 34 surrounding the cable area to mechanically secure the cable ends to the bond bar 32 (see FIGS. 2 and 3). Adjacent each end of the bond bar 32 a flexible metal grounding strap 36 is fastened to the bond bar. The grounding strap 36 is formed with apertures for receipt of a stud extending from a cable shield connector 37 on each cable end. Two polyvinylchloride spacers are installed between the two metal halves of the bond bar 32 and have studs 38 protruding from both sides of the bond bar to align the bond bar within the central longitudinal groove 31 and prevent any metallic portion of the bond bar from touching the lower shell portion 14 (see FIGS. 3 and 4). This eliminates any possible water path from the outer shell to and along the metal bond bar.

In use, the illustrated cable closure may be used to splice together cable ends 39 to form a tap splice with one cable end going into the closure spliced to two cable ends 39 coming out of the closure (see FIGS. 2-5). Likewise, the closure may be used to enclose a branch splice, a butt splice or an in-line splice. Each cable end 39 has its jacket 40 and shield 41 cut back so that the individual insulated wires 42 of the incoming cable end can be spliced to the appropriate individual insulated wires of the outgoing cable ends (see FIG. 2). Each cable end is clamped to the bond bar 32 in a hose clamp 34 with the end of the jacket 40 extending into the closure slightly beyond the hose clamp. Shield connectors 37 are applied to the cable ends and the grounding straps 36 are then connected to the studs extending from the shield connectors to connect the shields of the cables through the bond bar before the splice is made. Sealing collars 43 are provided on the cable jackets 40 adjacent the hose clamps 34 to provide a surface to which the encapsulant will bond well at the entrance to the closure to prevent ground water from entering the closure along the cable jackets. A preferred sealing collar 43 consists of a mastic, such as Scotch brand B Sealing Tape, available from the assignee of the present invention, overwrapped with a rubber electrical tape, such as TL-192 Rubber Splicing Tape (D.R.), available from Plymouth Rubber Company. The splicing of the insulated wires 42 is then made on the splice support surface 29 either with discrete connectors for each wire pair or modular connectors, as illustrated, connecting several wire pairs in each connector. The bond bar and splice assembly is then laid into the lower shell portion 14. The workman next removes a portion of the foam 22 from the upper shell portion 12 along the score lines appropriate for the diameter of cable used and the upper shell portion is then placed over the lower shell portion and forced downward until the latches 15 on the lower shell portion 14 engage the projections 16 on the upper shell portion 12.

At each end, over the lower chamber 24 the upper shell portion 12 is formed with an encapsulant introduction opening 44. At the ends of the dome portion 27 the upper shell 12 is formed with two further encapsulant introduction openings 45 communicating with the upper chamber 26. Preferably, a liquid encapulant 49 that hardens is introduced into one of the end openings 44 and sufficient encapsulant is introduced until it rises to the level of the top of the other end opening 44 to fill the lower chambers 24. Caps 48, temporarily retained in recesses at the ends of the upper shell portion 12, may then be placed in the end encapsulant openings 44. A reenterable encapsulant 47 that has a lower specific gravity, in either liquid or solid form than the hard encapsulant 49 in the liquid form may immediately be introduced into one of the upper encapsulant openings 45 until it rises to the level of the top of the other upper encapsulant opening to fill the upper chamber 26. The remaining two caps 48 may then be used to seal off the upper encapsulant openings 45. The combination of hard and reenterable encapsulant has the advantage that the hard encapsulant adds to the mechanical strength of the splice while the reenterable compound permits a workman to reenter the splice and make changes as needed. Ground water is sealed from the splice by the hard encapsulant 49 in the lower chambers 24 and the reenterable encapsulant 47 in the upper chamber 26. Any core water that might work its way into the splice closure at the end of the cable jacket 40 in the lower chamber 24 is prevented from rising into the upper chamber 26 where the splice is located by the hard encapsulant 49 which equalizes the pressure of the water in the core.

The upper shell portion 12 and lower shell portion 14 are preferably molded of polypropylene. The foam pieces 21 and 22 are preferably of polyurethane foam and the spacer web defining the splice support area 29 is preferably of polyvinylchloride. The bond bar is preferably formed of aluminum. A presently preferred hard encapsulant 49 is 3M Scotchcast brand 4407 Encapsulating and Blocking Compound and the presently preferred reenterable encapsulant is 3M brand Gella 4441 Reenterable Encapsulating Compound, both available from the assignee of the present invention. This combination has been found to work even when grease filled cables are spliced that have not been cleaned before splicing. A transition splice from pressurized cable to non-pressurized cable (including grease filled cable) may be made by using Scotchcast brand Haplec 4408 Blocking Compound, from the assignee of this the present invention, in the lower chambers and 3M brand Gella 4441 Reenterable Encapsulating Compound in the upper chamber.

It has been found necessary when using polypropylene for the outer shell 10 that the entire closure be filled with encapsulant and that a spacer web 29 be used because known encapsulants do not bond well to the polypropylene and it is, therefore, necessary to surround the splice with the encapsulant and have the splice only contact the polyvinylchloride web to which the encapsulant does bond well. For this reason, in the illustrated embodiment, spacer web material 50 extends along the entire floor of the closure, from one lower chamber 24 across the floor of the upper chamber 26 and the other lower chamber, and a piece of the spacer web material 50 is bonded to the inside of the dome 27. In some applications it may be desirable to use only one encapsulant to fill the entire closure, either a hard encapsulant or a reenterable encapsulant. And, if the outer shell 10 is made of a material to which an encapsulant will bond well, the upper encapsulant openings 44 may be sealed off and encapsulant introduced only into the lower chambers 24. Also within the invention it is only necessary that there be one lower chamber 24 if two cable ends 39 come from the same direction, as when making a butt splice, so that they appropriately would enter from only one end of the closure.

I claim:

1. A buried cable splice closure comprising:
   a rigid plastic outer shell having an opening at least at one end through which cables may extend into the closure,
   a lower chamber within said outer shell adjacent each said end opening in said outer shell for support of portions of cables extending into the closure,
   an upper chamber within said outer shell spaced longitudinally of the closure from each said end opening so as to have a lower chamber between each said end opening and said upper chamber, said upper chamber having a cable splice support area spaced a distance above each said lower chamber when said splice closure is in an upright position,
   a cable passageway within said outer shell from each said lower chamber to the cable splice support area in said upper chamber, and
   at least one cable end entering a said end opening in said outer shell extending through a said cable passageway and being spliced in said upper chamber to another cable end similarly entering said outer shell, the outer jacket and any shield material on each said cable end terminating in a said lower chamber,
   means for permitting introduction of an encapsulant through said outer shell into said upper chamber and each said lower chamber and passageway having a cable end therein, and
   encapsulant filling said upper chamber and each said lower chamber and passageway having a cable end therein.

2. The buried cable splice closure of claim 1 wherein said means for permitting introduction of an encapsulant comprises a resin introduction opening in the upper surface of said rigid plastic outer shell communicating with each said lower chamber and resin introduction openings in its upper surface communicating with said upper chamber.

3. The buried cable splice closure of claim 1 wherein said rigid plastic outer shell comprises an upper shell portion and a lower shell portion that are fastened together to form said outer shell.

4. The buried cable splice closure of claim 3 wherein said upper chamber is defined by a dome in said upper shell portion and a raised splice support surface in said lower shell portion.

5. The buried cable splice of claim 1 wherein each said lower chamber is filled with a hard encapsulant and said upper chamber is filled with a reenterable encapsulant.

6. A buried cable splice closure comprising:
   a rigid plastic outer shell having openings at its ends through which cables may extend into the closure,
   a lower chamber within said outer shell at each end thereof adjacent said end openings in said outer shell for support of portions of cables extending into the closure,
   an upper chamber centrally within said outer shell for support of at least one cable splice, said upper chamber having a cable splice support area spaced a distance above said lower chambers when said splice closure is in an upright position,
   a cable passageway within said outer shell from each of said lower chambers to said upper chamber through which cables may extend from said lower chambers to the cable splice support area in said upper chamber,
   at least one cable end entering a said end opening in said outer shell extending through a said cable passageway and being spliced in said upper chamber to another cable end similarly entering said outer shell, the outer jacket and any shield material on each said cable end terminating in a said lower chamber,
   means for permitting introduction of an encapsulant through said outer shell into said upper chamber and each said lower chamber end passageway having a cable end therein, and
   encapsulant filling said upper chamber and each said lower chamber and passageway having a cable end therein.

7. The buried cable splice closure of claim 6 wherein said means for permitting introduction of an encapsulant comprises a resin introduction opening in the upper surface of said rigid plastic outer shell communicating with each of said lower chambers and resin introduction openings in its upper surface communicating with said upper chamber.

8. The buried cable splice closure of claim 6 wherein said rigid plastic outer shell comprises an upper shell portion and a lower shell portion that are fastened together to form said outer shell.

9. The buried cable splice closure of claim 8 wherein said upper chamber is defined by a dome centrally of said upper shell portion and a raised splice support surface centrally of said lower shell portion.

10. The buried cable splice closure of claim 9 wherein said upper shell portion is formed with a resin introduction opening adjacent each end communicating with said lower chambers and resin introduction openings in said dome communicating with said upper chamber.

11. The buried cable splice closure of claim 9 wherein said raised splice support surface in said lower shell portion is formed with a central longitudinal groove extending between said lower chambers and including a bond bar formed to extend through said central longitudinal groove and means for mechanically connecting said bond bar to cable portions in said lower chambers.

12. The buried cable splice closure of claim 11 wherein said bond bar is electrically conductive and including means connected to said bond bar for making electrical connection to the shielding of cable portions in said lower chambers.

13. The buried cable splice of claim 6 wherein each said lower chamber is filled with a hard encapsulant and said upper chamber is filled with a reenterable encapsulant.

* * * * *